United States Patent
Nakajima (10) Patent No.: US 9,790,976 B2
(45) Date of Patent: Oct. 17, 2017

(54) FASTENER

(71) Applicant: PIOLAX, INC., Yokohama-shi (JP)

(72) Inventor: Takeshi Nakajima, Yokohama (JP)

(73) Assignee: Piolax, Inc., Yokohama-shi, Kanagawa (JP)

( * ) Notice: Subject to any disclaimer, the term of this patent is extended or adjusted under 35 U.S.C. 154(b) by 29 days.

(21) Appl. No.: 15/099,339

(22) Filed: Apr. 14, 2016

(65) Prior Publication Data

US 2016/0305461 A1 Oct. 20, 2016

(30) Foreign Application Priority Data

Apr. 15, 2015 (JP) ................................. 2015-083661

(51) Int. Cl.
| F16B 13/06 | (2006.01) |
| F16B 19/10 | (2006.01) |
| F16B 5/06 | (2006.01) |

(52) U.S. Cl.
CPC ........ *F16B 19/1081* (2013.01); *F16B 5/0642* (2013.01)

(58) Field of Classification Search
CPC .... F16B 5/0642; F16B 13/06; F16B 19/1081; F16B 21/084
USPC ...................... 411/45–48, 363, 508, 509, 510
See application file for complete search history.

(56) References Cited

U.S. PATENT DOCUMENTS

| 3,810,279 A | * | 5/1974 | Swick | ................... | F16B 21/084 |
| | | | | | 411/508 |
| 3,988,808 A | * | 11/1976 | Poe | ......................... | F16B 21/02 |
| | | | | | 24/297 |
| 5,641,255 A | * | 6/1997 | Tanaka | ................ | F16B 19/1081 |
| | | | | | 411/45 |
| 5,689,863 A | * | 11/1997 | Sinozaki | ............. | F16B 19/1081 |
| | | | | | 24/297 |
| 5,704,753 A | * | 1/1998 | Ueno | .................... | F16B 21/086 |
| | | | | | 24/297 |
| 5,775,860 A | * | 7/1998 | Meyer | ................. | F16B 19/1081 |
| | | | | | 411/41 |
| 5,846,040 A | * | 12/1998 | Ueno | .................. | F16B 19/1081 |
| | | | | | 411/369 |
| 6,045,309 A | * | 4/2000 | LeVey | ................. | F16B 19/1081 |
| | | | | | 411/349 |

(Continued)

FOREIGN PATENT DOCUMENTS

JP 2006-017300 A 1/2006

*Primary Examiner* — Roberta Delisle
(74) *Attorney, Agent, or Firm* — McGinn IP Law Group, PLLC (57) ABSTRACT

An embodiment provides a fastener including a locking member and a pin member which are connected. The locking member has a pair of leg portions that are inserted into the mount hole and a flange portion that is brought into abutment with a portion of the mount-base member that lies on a circumference of the mount hole. The pin member has a head portion that is connected to the flange portion and an extending portion that extends from a rear side of the head portion. When the head portion of the pin member is forced into the locking member, a connection between the flange portion and the head portion is released, and the extending portion travels between the pair of leg portions to expand open the pair of leg portions or to restrict the pair of leg portions from moving towards each other.

6 Claims, 8 Drawing Sheets

(56) References Cited

U.S. PATENT DOCUMENTS

| | | | | |
|---|---|---|---|---|
| 6,305,055 B1* | 10/2001 | Castro | .................... | F16B 21/086 |
| | | | | 24/458 |
| 6,533,515 B2* | 3/2003 | Meyer | ................. | F16B 19/1081 |
| | | | | 24/453 |
| 6,769,849 B2* | 8/2004 | Yoneoka | ............... | F16B 5/0642 |
| | | | | 411/41 |
| 6,874,983 B2* | 4/2005 | Moerke | ............... | F16B 19/1081 |
| | | | | 24/297 |
| 6,910,840 B2* | 6/2005 | Anscher | ............. | F16B 19/1081 |
| | | | | 411/41 |
| 6,932,552 B2* | 8/2005 | Anscher | ............. | F16B 19/1081 |
| | | | | 24/297 |
| 7,243,401 B2* | 7/2007 | Sawatani | ................. | F16B 21/06 |
| | | | | 24/297 |
| 7,841,817 B2* | 11/2010 | Kawai | ................ | F16B 19/1081 |
| | | | | 411/41 |
| 7,862,272 B2* | 1/2011 | Nakajima | ........... | F16B 19/1081 |
| | | | | 411/41 |
| 8,043,038 B2* | 10/2011 | Sano | .................. | F16B 19/1081 |
| | | | | 24/297 |
| 2001/0022923 A1* | 9/2001 | Arisaka | ................... | F16B 5/123 |
| | | | | 411/45 |
| 2008/0031701 A1* | 2/2008 | Boubtane | ............ | F16B 19/1081 |
| | | | | 411/80.1 |
| 2008/0031703 A1 | 2/2008 | Nakajima | | |
| 2012/0057948 A1* | 3/2012 | Jeon | ................... | F16B 19/1081 |
| | | | | 411/357 |
| 2014/0093325 A1* | 4/2014 | Mizukoshi | ........... | F16B 13/063 |
| | | | | 411/45 |

\* cited by examiner

FASTENER

CROSS-REFERENCE TO RELATED APPLICATION(S)

This application claims priority from Japanese Patent Application No. 2015-083661 filed on Apr. 15, 2015, the entire contents of which are incorporated herein by reference.

FIELD

The present invention relates to a fastener that is retained in a mount hole in a mount-base member.

BACKGROUND

JP-2006-017300-A discloses a clip that is mounted in a mount hole. The clip is made up of a first member and a second member that are formed as an integral unit. The first member has an enlarged head portion having a circular disc shape and a shaft portion that extends downwards perpendicularly from a lower surface of the enlarged head portion. The second member includes a circular disc-shaped collar portion having an opening and a circular cylindrical leg portion that extends downwards perpendicularly from a lower surface of the collar portion.

In JP-2006-017300-A, a distal end of the shaft portion of the first member and an edge of the opening in the second member are connected together by a small bridging piece. The small bridging piece is broken by inclining the first member and the second member. After the breakage of the small bridging piece, the second member is inserted in the mount hole, and then, the shaft portion of the first member is inserted into the leg portion of the second member, whereby the clip is mounted in the mount hole.

In JP-2006-017300-A, since the distal end of the first member and the collar portion of the second member are connected together, a long stroke is needed in forcing the shaft portion of the first member into the circular cylindrical portion of the second member, there is possibility that the first member is mounted in the second member with the shaft portion of the first member inclined when the first member is forced into the second member.

SUMMARY

One object of the present invention is to provide a technique that facilitates the forcing of a pin member into a locking member.

One embodiment of the present invention provides a fastener including:
  a locking member that can be locked in a mount hole in a mount-base member; and
  a pin member that can be forced into the locking member and is connected to the locking member,
    wherein the locking member has
      a pair of leg portions that are inserted into the mount hole and
      a flange portion that is brought into abutment with a portion of the mount-base member that lies on a circumference of the mount hole,
    wherein the pin member has
      a head portion that is connected to the flange portion and
      an extending portion that extends from a rear side of the head portion, and wherein, when the head portion of the pin member is forced into the locking member, a connection between the flange portion and the head portion is released, and the extending portion travels between the pair of leg portions to expand open the pair of leg portions or to restrict the pair of leg portions from moving towards each other.

According to the invention, it is possible to provide the fastener that facilitates the forcing of the pin member into the locking member.

BRIEF DESCRIPTION OF DRAWINGS

FIGS. 1A and 1B are perspective views of a fastener, of which

DETAILED DESCRIPTION

Figure 1A:
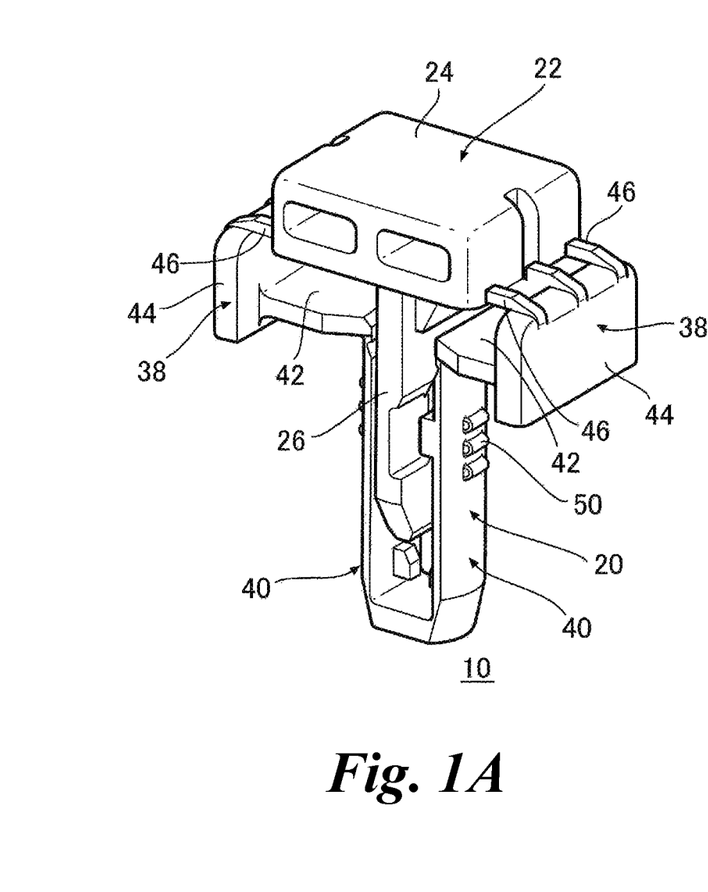
FIG. 1A shows the fastener in which constituent parts are in connection and FIG. 1B shows the fastener in which one constituent part has been completely forced into the other constituent part.
Figure 1B:
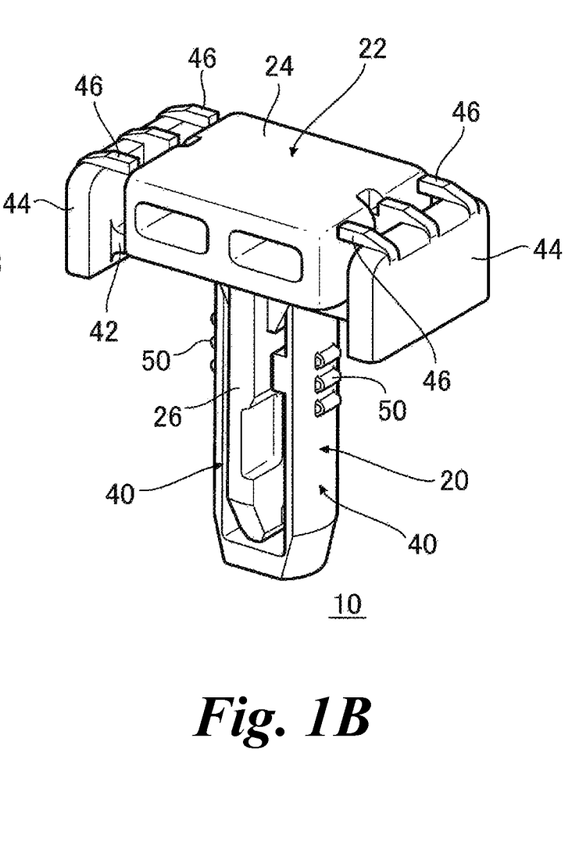

FIGS. 1A and 1B are perspective views of a fastener 10, of which FIG. 1A shows the fastener 10 in which constituent parts are in connection and FIG. 1B shows the fastener 10 in which one constituent part has been completely forced into the other constituent part. The fastener 10 includes a locking member 20 that is locked in a mount hole in a mount-base member and a pin member 22 that is inserted into the locking member 20, and the locking member 20 and the pin member 22 are formed into an integral unit.

The mount hole in which the fastener 10 is retained is formed in a body or an on-board unit of a vehicle and is formed as a threaded hole in, for example, a transmission. The fastener 10 shown in FIG. 1A, in which the locking member 20 and the pin member 22 are kept in connection with each other, is inserted into the mount hole, and the pin member 22 is forced into the locking member 20, whereby the forcing of the pin member 22 into the locking member 20 is completed as shown in FIG. 1B. This completes the mounting of the fastener 10 into the mount hole.

The locking member 20 has a flange portion 38 that is caught on a front surface of the mount-base member and a pair of leg portions 40 that extend from a rear side of the flange portion 38. In this fastener 10, a pair of flange portions 38 are formed individually on the pair of leg portions 40 so as to be spaced apart from each other. A direction in which the pair of leg portions 40 face each other will be referred to as a facing direction, and a direction in which the leg portions 40 and/or an extending portion 26 extends will be referred to as an axial direction.

The pair of flange portions 38 have a pair of projecting portions 42 that project individually from proximal end portions of the pair of leg portions 40 so as to move away from each other and a pair of upright portions 44 that are provided individually on the pair of projecting portions 42 so as to stand in the axial direction. Outer circumferential surfaces of the leg portions 40 are curved, and the leg portions 40 each have an arc-shaped cross section when cut along a plane that is at right angles to the axial direction. A plurality of ridge portions 50 are formed on an outer surface of each of the pair of leg portions 40 in a step-like fashion along the axial direction. These ridge portions 50 are brought into engagement with a threaded groove on the mount hole when the fastener 10 is inserted into the mount hole.

The pin member 22 has a head portion 24 and the extending portion 26 that extends from a rear side of the head portion 24. As shown in FIG. 1A, connecting portions 46 are provided which connect together the head portion 24 of the pin member 22 and the flange portions 38 of the locking member 20.

The necessity of assembling work can be obviated by integrating the locking member 20 with the pin member 22 by means of the connecting portions 46. When applied to the transmission of the vehicle, the fastener 10 is formed from a resin material including a hard resin material such as glass fibres so as to withstand hydraulic pressure, vibrations and high temperatures. Even with a material that has difficulty in deflection, by connecting the locking member 20 and the pin member 22 together by means of the connecting portions 46, the locking member 20 and the pin member 22 can be integrated with each other without needing a temporary holding by making use of deflection. Since the locking member 20 and the pin member 22 are integral, the transportation and assemblage of the fastener 10 are facilitated. The constituent members of the fastener 10 will be described by reference to the other drawings.

Figure 2A:
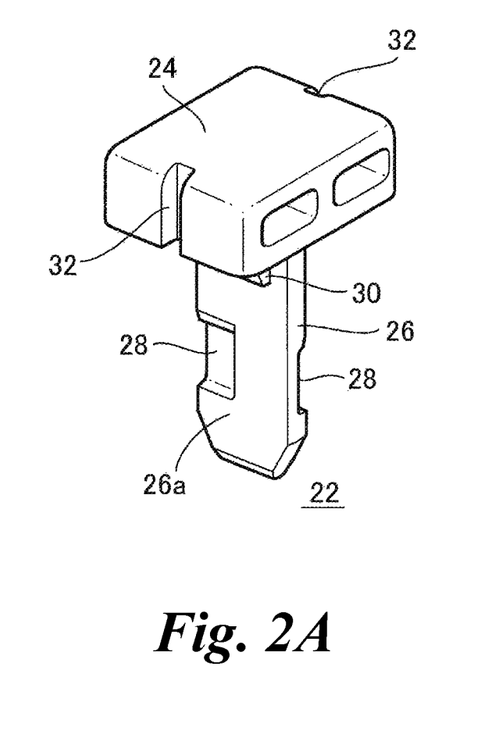
FIGS. 2A and 2B illustrate a pin member.
Figure 2B:
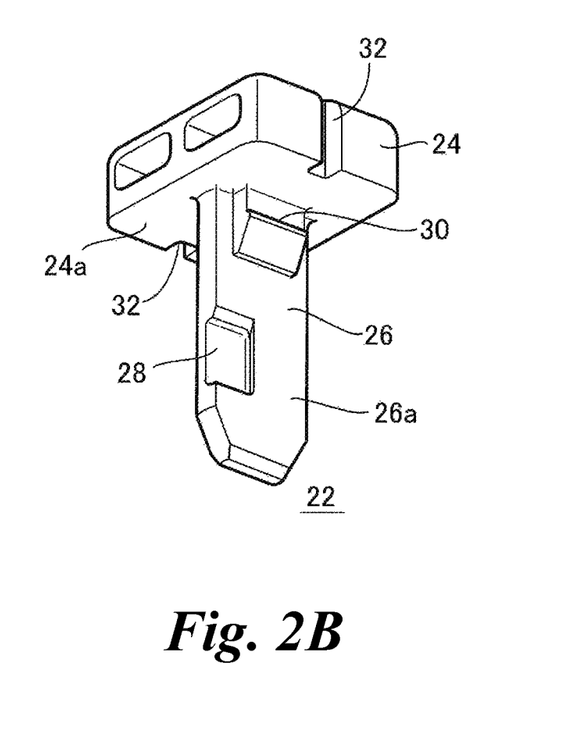

FIGS. 2A and 2B illustrate the pin member 22. FIG. 2A is a perspective view of the pin member 22 as viewed from a front side, and FIG. 2B is a perspective view of the pin member 22 as viewed from a rear side thereof. Here, like reference numerals will be given to the same or like constituent elements shown in the drawings, and the repetition of the same or similar descriptions will be omitted as required.

The head portion 24 has a prism-like shape and has guide groove portions 32 that are cut out axially on both side surfaces of the head portion 24. The extending portion 26 extends downwards perpendicularly from a seat surface 24a of the head portion 24 that lies on a rear side thereof and has a plate-like shape.

The extending portion 26 has facing surfaces 26a that are held between the pair of leg portions 40 of the locking member 20 to face the leg portions 40 and a pair of recess portions 28 that are formed individually on the facing surfaces 26a. A expanding portion 30 is formed on each of the facing surfaces 26a at a root side of the extending portion 26. The expanding portion 30 is inclined upwards from a distal end side towards the root side of the extending portion 26 so as to project outwards in the facing direction, and a tip is formed into a claw-like shape.

Figure 3A:
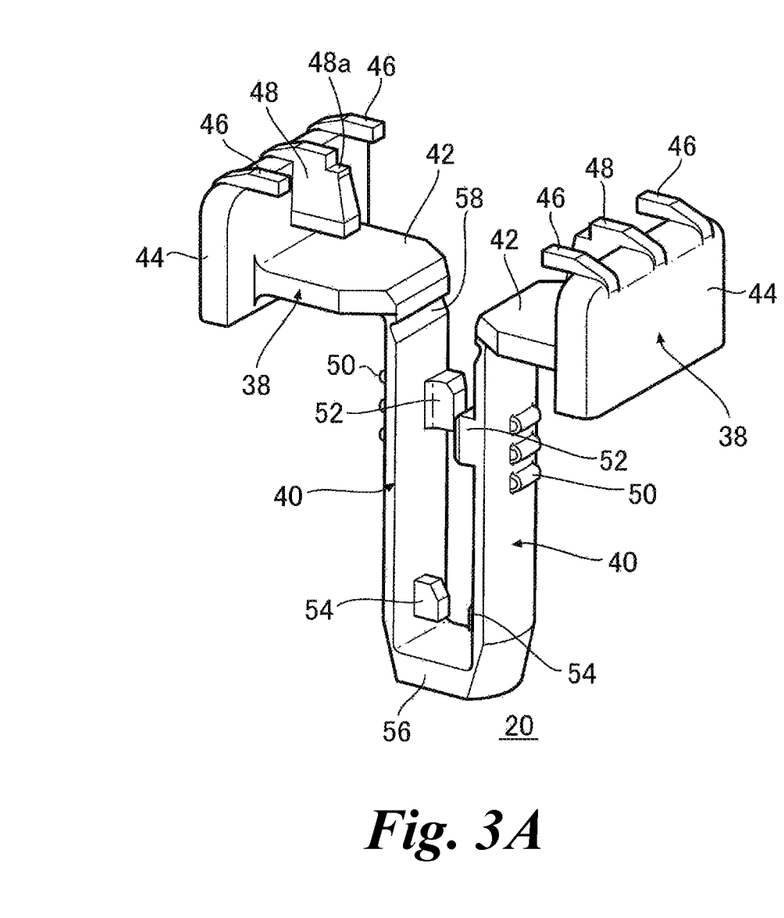
FIG. 3A is a perspective view of a locking member as viewed from a front side.
Figure 3B:
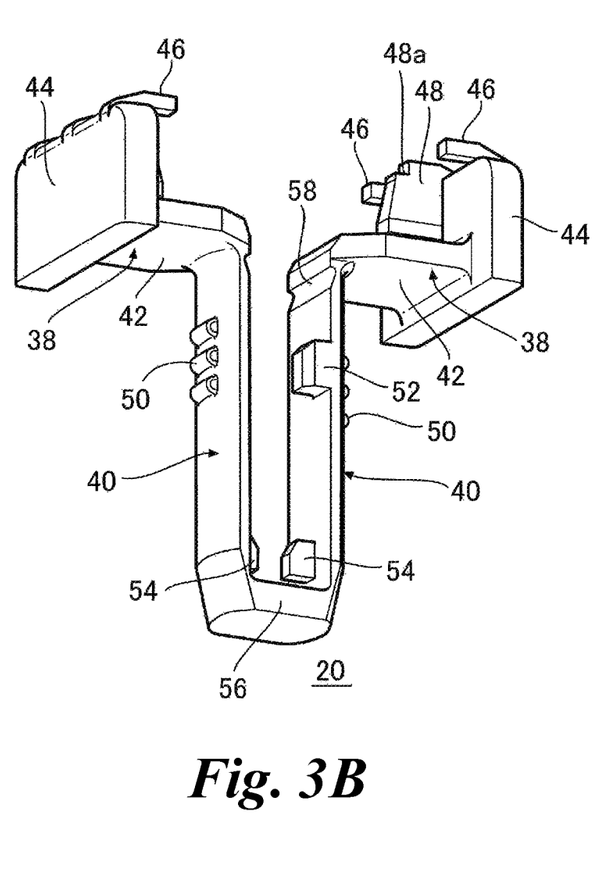
FIG. 3B is a perspective view of the locking member as viewed from a rear side thereof.
Figure 4A:
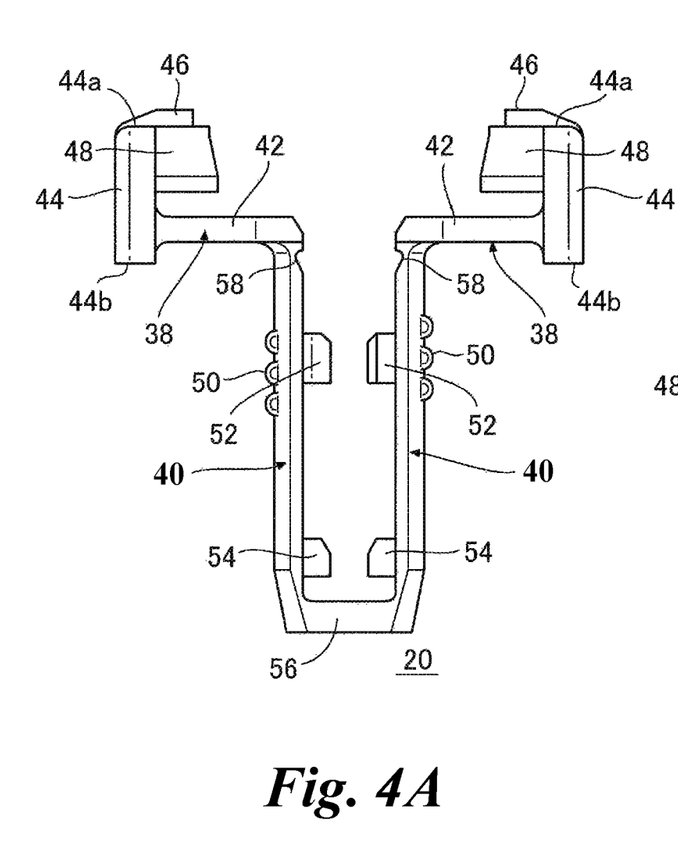
FIG. 4A is a front view of the locking member.
Figure 4B:
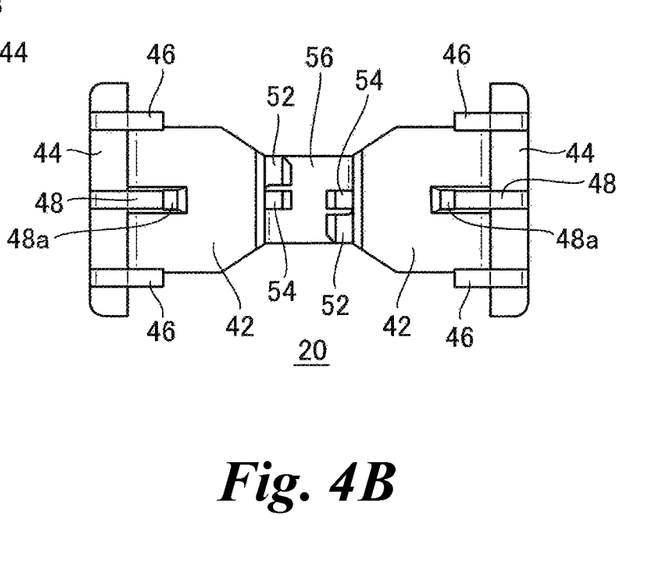
FIG. 4B is a plan view of the locking member.

FIG. 3A is a perspective view of the locking member 20 as viewed from a front side, and FIG. 3B is a perspective view of the locking member 20 as viewed from a rear side thereof. FIG. 4A is a front view of the locking member 20, and FIG. 4B is a plan view of the locking member 20.

The flange portions 38 are brought into a front surface of the mount-base member around the mount hole. The flange portions 38 each have the projecting portion 42, the upright portion 44 and a guide portion 48. The flange portions 38 each include the plurality of pillar-shaped connecting portions 46 that are connected to the pin member 22. The connecting portions 46 are formed so as to extend in a direction that intersects the axial direction and along the facing direction.

The projecting portion 42 has a flat plate-like shape and extends so as to be at right angles to the axial direction. The pair of projecting portions 42 continue individually to proximal ends of the pair of leg portions 40 and project so as to move away from the pair of leg portions 40. An end portion of the projecting portion 42 that lies outboard in the facing direction continues to an inner surface of the upright portion 44.

The pair of upright portions 44 are formed into a wall-like shape while continuing to the outboard end portions of the projecting portions 42. The upright portions 44 extend along the axial direction and face each other as the pair of leg portions 40 do. The pluralities of connecting portions 46 are connected individually to upper ends 44a of the upright portions 44. The guide portions 48 are each formed so as to project in the facing direction from the inner surface of the corresponding upright portion 44. A cutout portion 48a is formed on each of the guide portions 48 by cutting out an upper distal corner of the guide portion 48.

As shown in FIG. 4A, an axial thickness of the projecting portion 42 is thinner than a thickness of the upright portion 44 in the facing direction, so that the projecting portion 42 can deflect easily. The projecting portion 42 is provided to continue to a position lying along a vertical length of the inner surface of the upright portion 44 and is situated further upwards in the axial direction than a lower end 44b of the upright portion 44. Thus, in mounting the fastener 10 on the mount-base member, the projecting portion 42 is left not in touch with the front surface of the mount-base member and becomes easy to deflect. By causing the projecting portions 42 to deflect, the pair of leg portions 40 can be forced downwards into the mount hole.

The leg portions 40 each have the plurality of ridge portions 50, a projecting portion 52, a protruding portion 54 and an engagement portion 58. The pair of leg portions 40 are connected together at distal end portions 56 to be integrated into a unit. The projecting portion 52 and the protruding portion 54 are formed on an inner surface of the leg portion 40 so as to project and protrude in the facing direction. The projecting portion 52 is positioned closer to a proximal end side of the leg portion 40 than the protruding portion 54. The projecting portion 52 and the ridge portions 50 are provided so as to overlap in position in relation to the axial direction.

As shown in FIG. 4B, the pair of projecting portions 52 are offset in a width direction, and the pair of protruding portions 54 are provided centrally in the width direction so as to face each other squarely. When the extending portion 26 of the pin member 22 is forced in between the pair of leg portions 40, the extending portion 26 can be restricted from getting loose or rattling in the facing direction, axial run-out and twisting by the projecting portions 52 and the protruding portions 54. The engagement portion 58 is formed by depressing the inner surface of the leg portion 40 in a position lying closer to the proximal end side of the leg portion 40 than the projecting portion 52.

Figure 5A:
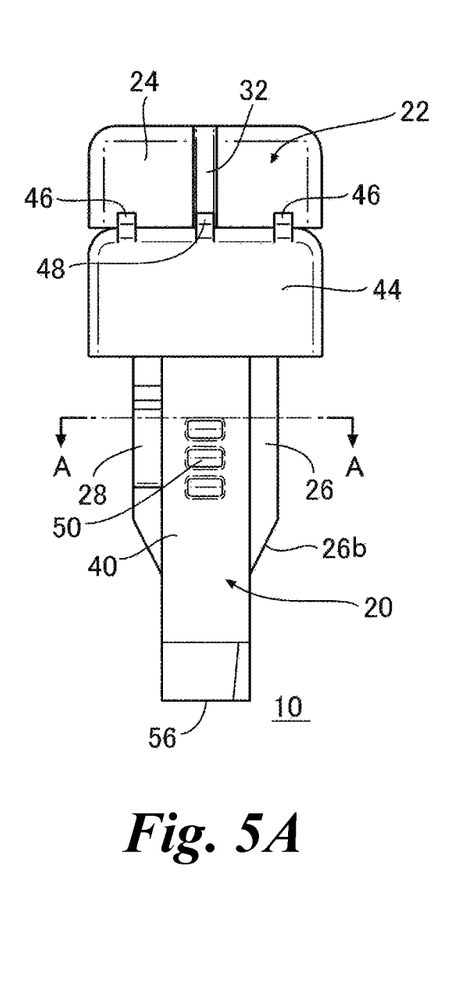
FIG. 5A is a side view of the fastener.
Figure 5B:
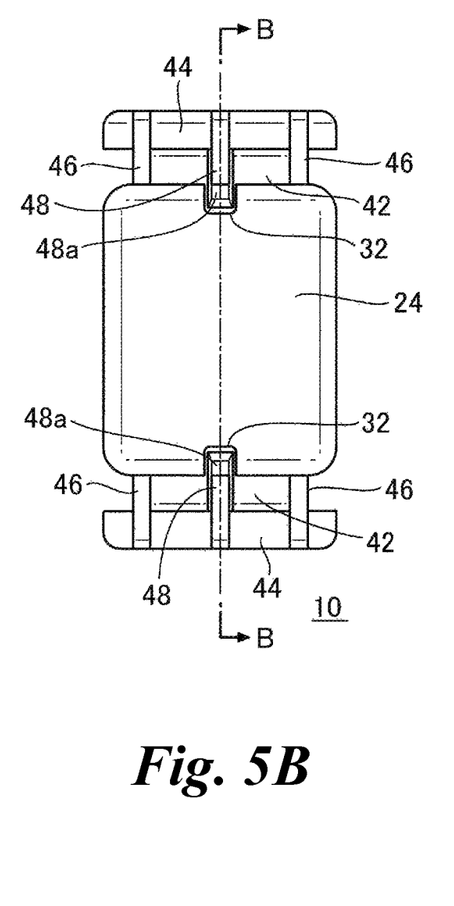
FIG. 5B is a plan view of the fastener.
Figure 6A:
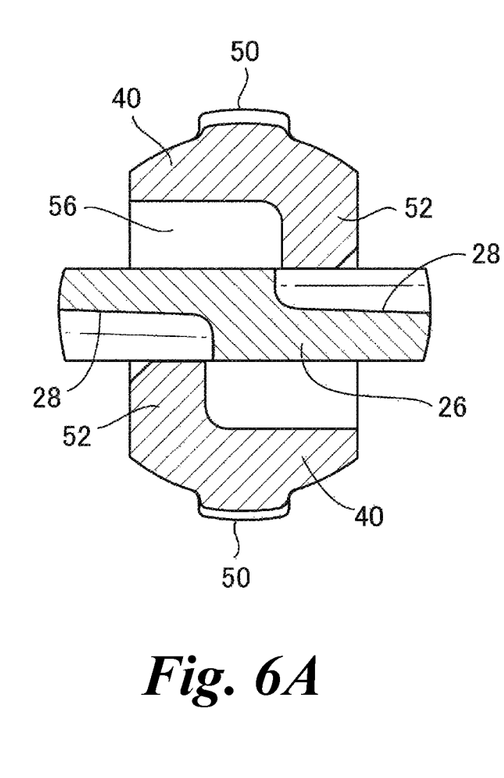
FIG. 6A is a sectional view of the fastener taken along a line A-A in FIG. 5A.
Figure 6B:
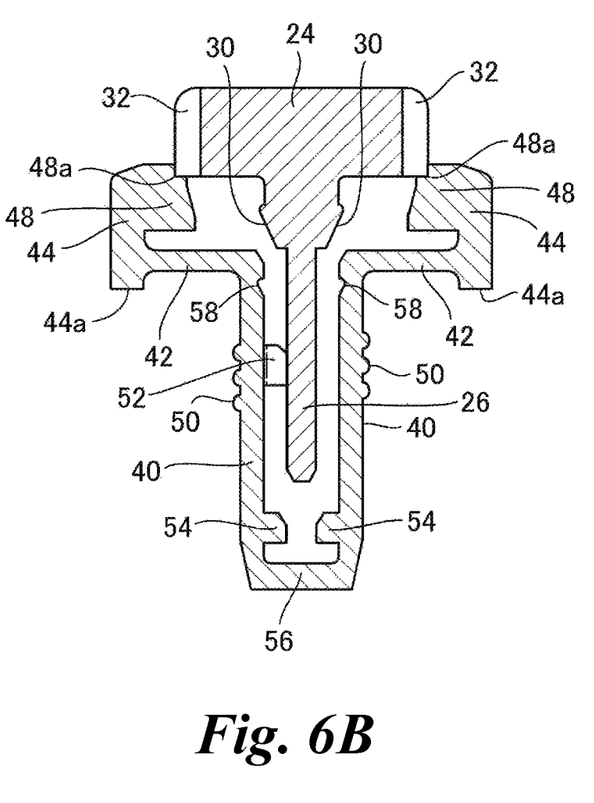
FIG. 6B is a sectional view of the fastener taken along a line B-B in FIG. 5B.

FIG. 5A is a side view of the fastener 10, and FIG. 5B is a plan view of the fastener 10. FIG. 6A is a sectional view of the fastener 10 taken along a line A-A in FIG. 5A, and FIG. 6B is a sectional view of the fastener 10 taken along a line B-B in FIG. 5B.

As shown in FIG. 5A, a width of the extending portion 26 of the pin member 22 is greater than a width of the leg portion 40 of the locking member 20. Thus, when the fastener 10 is inserted into the mount hole, looseness or rattling of the fastener 10 in a direction that is at right angles to the facing direction can be suppressed by side edges of the extending portion 26. The ridge portions 50 on the locking member 20 are provided in a position that overlaps recess portions 28 on the pin member 22 in the axial direction. The ridge portions 50 are provided in the position where deflection takes place easily when the fastener 10 is inserted into the mount hole. A distal end portion 26b of the extending portion 26 is tapered so as to be restrained from being caught by other fasteners 10 at the time of transportation. The distal end portion 26b is situated closer to the distal end portion 56 than the ridge portions 50 so as to enter the mount hole before the ridge portions 50 to thereby function as a guide when the fastener 10 is inserted into the mount hole.

As shown in FIGS. 5A and 5B, the connecting portions 46 connect side surfaces of the head portion 24 on a side facing the seat surface 24a and the upper ends 44a of the upright portions 44 together. Spaces defined on an upper end side of the fastener 10 between the head portion 24 and the upright portions 44 are cut off by the connecting portions 46, which can make it difficult for the fastener 10 to be brought into entanglement in other fasteners 10 at the time of transportation. The connecting portions 46 are joined to the upright portions 44 over a wider area than to the head portion 24. Thus, the connecting portions 46 are broken on the head portion 24 side so as to remain on the upright portions 44, reducing the possibility that the connecting portions 46 remaining on the head portion 24 disturb the movement of the head portion 24 when the head portion 24 is forced in.

As shown in FIG. 5B, the side surfaces of the head portion 24 are spaced apart from the upright portions 44 in the facing direction. Thus, the upright portions 44 are allowed to fall towards the head portion 24 when the head portion 24 is forced in. The plurality of connecting portions 46 connect to the head portion 24 at four corners thereof. Thus, the possibility that all the connecting portions 46 are broken at the time of transportation can be reduced, this making it difficult for the fastener 10 to be brought into entanglement in other fasteners 10. The connecting portions 46 are formed in the direction that is at right angles to the direction in which the pin member 22 is forced in. Therefore, the connecting portions 46 are configured so as to be broken easily when the pin member 22 is forced into the locking member 20.

As shown in FIGS. 5B and 6B, the guide portions 48 project so as to enter the corresponding guide groove portions 32 and restrict the pin member 22 from getting out of place in the width direction or rotating when the pin member 22 is forced in the locking member 20.

As shown in FIG. 6A, with the pin member 22 kept in connection with the locking member 20, the recess portions 28 and the projecting portions 52 are disposed so as to face each other while being spaced apart from each other. Thus, the pair of leg portions 40 are allowed to deflect so as to move towards each other, whereby when the fastener 10 is inserted into the mount hole with the ridge portions 50 brought into abutment with the mount hole, the pair of leg portions 40 are allowed to move towards each other, thereby facilitating the insertion of the fastener 10 into the mount hole.

As shown in FIG. 6B, with the pin member 22 kept in connection with the locking member 20, part of the extending portion 26 is held by the pair of leg portions 40 therebetween. Thus, an axial length of the fastener 10 can be made short, and the extending portion 26 can extend long between the pair of leg portions 40. By extending the length of the extending portion 26, the extending portion 26 can be restrained from being mounted while being inclined. A length over which the pin member 22 is forced into the locking member 20 can be reduced compared with a case where the pin member 22 and the locking member 20 are formed separately, thereby making it possible to reduce the possibility that the pin member 22 is mounted while being inclined.

Figure 7A:
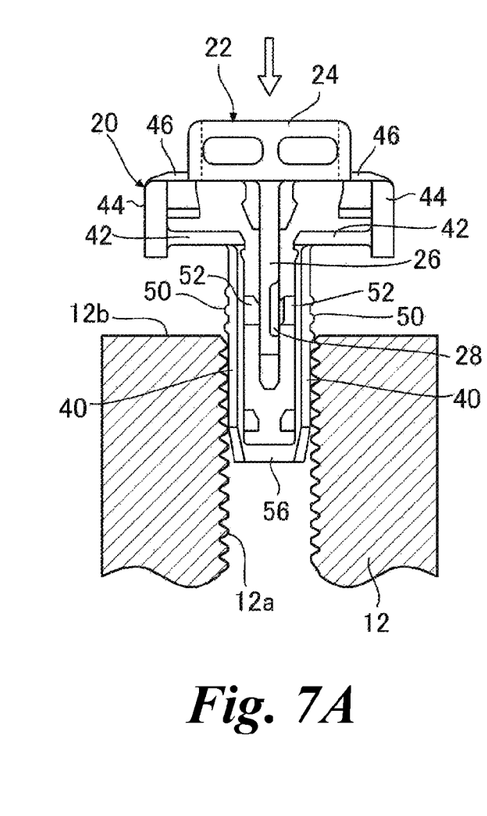
FIGS. 7A, 7B, 7C illustrate an inserting process of the fastener into a mount hole.
Figure 7B:
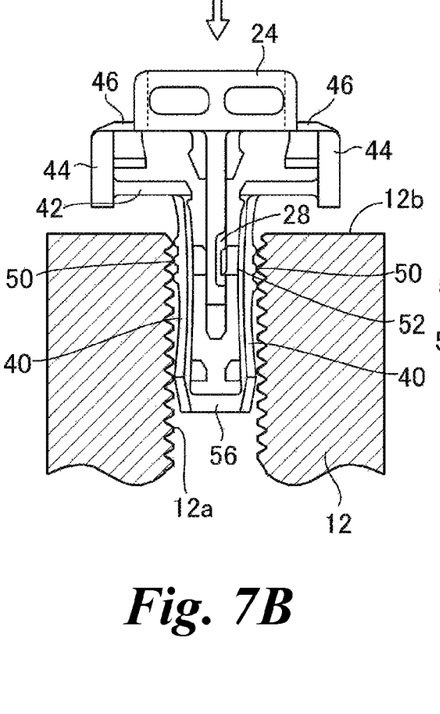
Figure 7C:
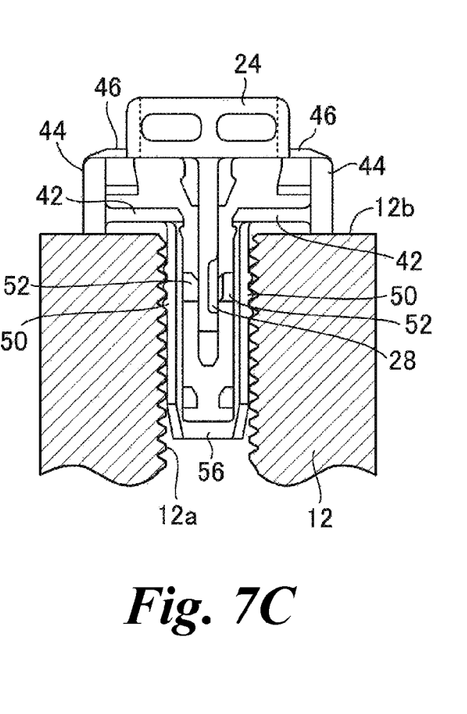

FIG. 7, that is, FIGS. 7A, 7B, 7C illustrate an inserting process of the fastener 10 into a mount hole 12a. FIG. 7A shows a state in which the fastener 10 in which the locking member 20 and the pin member 22 are in connection with each other is being inserted into the mount hole 12a in a mount-base member 12 from the distal end portion 56.

In FIG. 7B, the ridge portions 50 enter the mount hole 12a, and the pair of leg portions 40 deflect so as to move towards each other. On the inner sides of the pair of leg portions 40, the projecting portions 52 project towards the extending portion 26, however, since the recess portions 28 on the extending portion 26 are situated to face the projecting portions 52, the projecting portions 52 enter the corresponding recess portions 28, whereby the leg portions 40 are allowed to deflect. The deflection of the pair of leg portions 40 can reduce the inserting force. The connecting portions 46 are set to such a strength that the connecting portions 46 are not broken even in the event of the pin member 22 is pushed in inserting the locking member 20 into the mount hole 12a.

As shown in FIG. 7C, the lower ends 44b of the upright portions 44 are brought into abutment with a front surface 12b of the mount-base member 12 to end the insertion of the locking member 20 into the mount hole 12a. However, the connecting portions 46 are kept unbroken, and the pin member 22 has not yet been completely forced in. The ridge portions 50 are brought into engagement with screw threads on the mount hole 12a. In this way, as a result of the locking member 20 and the pin member 22 being provided as the integral unit, inserting the locking member 20 into the mount hole 12a means that the pin member 22 can also be inserted into the mount hole 12a together with the locking member 20, thereby facilitating the mounting work.

When the pin member 22 is pushed in which is in connection with the locking member 20 as shown in FIG. 7C, due to the movement of the locking member 20 being restricted by the abutment of the upright portions 44 with a front surface 12b of the mount-base member 12, a push-in force is given to the connecting portions 46 whereby the connecting portions 46 are broken, thereby releasing the connection between the connecting portions 46 with the pin member 22. Further, the mounting work will be described by reference to FIG. 8.

Figure 8A:
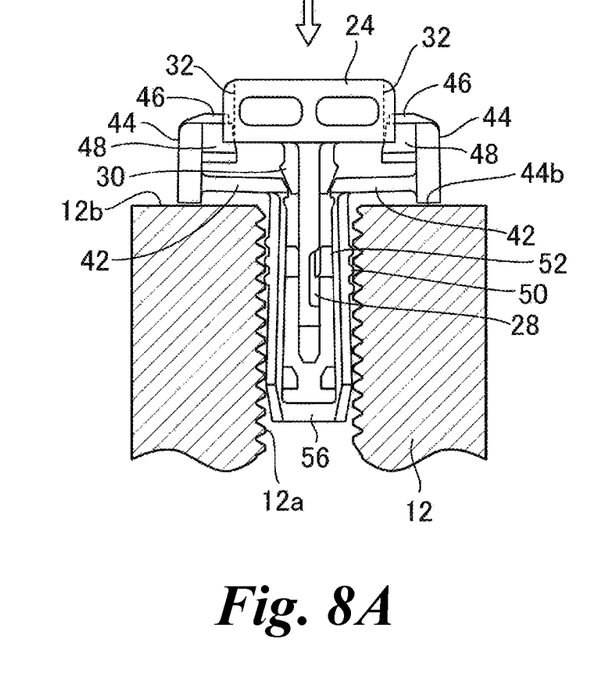
FIGS. 8A and 8B illustrate a forcing process of the pin member in the fastener that has been inserted in the mount hole.
Figure 8B:
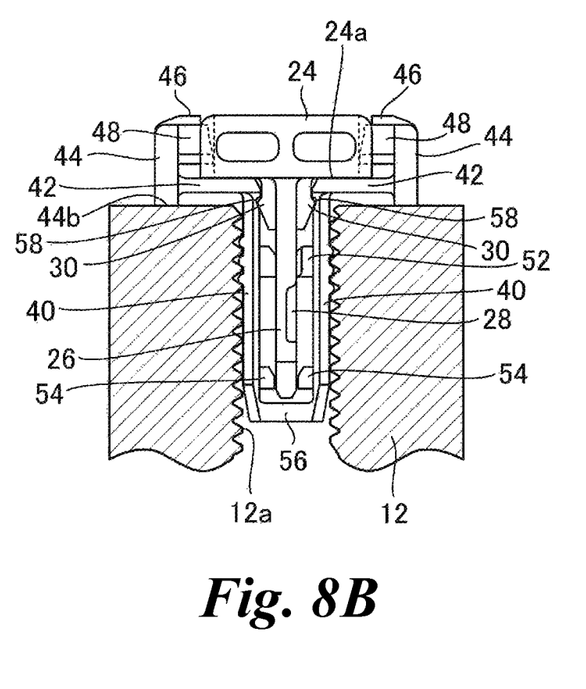

FIG. 8, that is, FIGS. 8A and 8B illustrate a forcing process of the pin member 22 in the fastener 10 that has been inserted in the mount hole 12a. As shown in FIG. 8A, the connecting portions 46 are broken, whereupon the pin member 22 moves relatively to the locking member 20 in the axial direction to be forced thereinto. The guide portions 48 enter the guide groove portions 32 to guide the axial movement of the pin member 22. In addition, the projecting portions 52 start to deviate from the recess portions 28 in the axial direction.

Even though the connecting portions 46 are broken, since the connecting portions 46 are situated further upwards than the front surface 12b of the mount-base member 12, it is possible to reduce possibility that the broken connecting portions 46 enter an interior of the mount hole 12a as foreign matters. Then, washing the front surface 12b of the mount-base member 12 after the fastener 10 has been assembled removes the broken connecting portions 46 that are now foreign matters. Providing the projecting portions 42 on the front surface 12b side below the connecting portions 46 can suppress the intrusion of foreign matters into the mount hole 12a.

When the pin member 22 moves downwards in the axial direction, the expanding portions 30 are brought into abutment with the projecting portions 42 and/or the leg portions 40 to thereby expand open the pair of projecting portions 42 so that the pair of projecting portions 42 move outwards away from each other in the facing directions. Even though the connecting portions 46 are broken to cause the upright portions 44 to move inwards towards each other in the facing directions, the expanding portions 30 restrain the upright portions 44 from moving towards the head portion 24 as falling down thereto and expand open the pair of flange portions 38, thereby making it possible to facilitate the forcing of the pin member 22 into the locking member 20. The abutment of the expanding portions 30 with the locking member 20 on the front surface 12b side of the mount-base member 12 facilitates the deflection of the leg portions 40 that now stay in the mount hole 12a, thereby making it possible to reduce the inserting force. Since the projecting portions 42 are spaced apart from the front surface 12b, the projecting portions 42 are easy to be expanded open in a direction in which the projecting portions 42 move away from each other. Thus, with the upright portions 44 kept in abutment with the front surface 12b, the projecting portions 42 cause the leg portions 40 to move in the axial direction, so that the ridge portions 50 are aligned in pitch with the screw threads on the mount hole for engagement therewith.

As shown in FIG. 8B, the seat surface 24a of the head portion 24 is brought into abutment with the projecting portions 42, and this completes the forcing of the pin member 22 into the locking member 20. The tips of the expanding portions 30 are brought into engagement with the engagement portions 58 which are depressed with the forcing operation of the pin member 22 completed. This can prevent the pin member 22 from being dislocated from the locking member 20. In this way, the fastener 10 can be mounted in the mount hole 12a only by forcing the pin member 22 into the mount hole 12a.

The extending portion 26 is held by the pair of protruding portions 54 at the distal end side thereof and is then restricted from moving in the facing directions. This allows the extending portion 26 to be formed long in the axial direction, which can suppress the axial run-out of the extending portion 26 while increasing a strength against prying.

With the forcing operation of the pin member 22 completed, the projecting portions 52 deviate from the recess portions 28 in the axial direction, whereby the pair of leg portions 40 are restricted from moving towards each other. This keeps the ridge portions 50 in engagement with the screw threads on the mount hole 12a and makes it difficult for the fastener 10 from being dislocated from the mount hole 12a.

As shown in FIG. 7B, when the leg portions 40 including the ridge portions 50 are inserted into the mount hole 12a, the leg portions 40 deflect so as to move towards each other with the projecting portions 52 entering the recess portions 28. Then, as shown in FIG. 8B, when the pin member 22 is completely forced into the locking member 20, the projecting portions 52 are brought into abutment with the surfaces of the extending portions 26 and restrict the deflection of the leg portions 40 attempting to move towards each other. This can realize the strong and rigid locking of the locking member 20 in the mount hole 12a while facilitating the insertion of the locking member 20 into the locking hole 12a.

The present invention is not limited to the embodiment described heretofore, and it is also possible to add modifications such as various kinds of design changes to the embodiment based on the knowledge of those skilled in the art. Embodiments to which such modifications are added can also be included within the scope of the present invention.

While the connecting portions 46 are described as being connected to the upper ends 44a of the upright portions 44 and the side surfaces of the head portion 24, the invention is not limited thereto. For example, the connecting portions 46 may be connected to inner wall surfaces of the upright portions 44 and to the seat surface 24a of the head portion 24.

In the embodiment, the projecting portions 52 of the leg portions 40 and the recess portions 28 of the extending portion 26 are described as facing each other with the locking member 20 kept in connection with the pin member 22. However, the invention is not limited thereto. Recess portions may be formed on the leg portions 40, and projecting portions may be formed on the extending portion 26.

In the embodiment, the pair of leg portions 40 are described as being connected together by the distal end portion 56. However, the invention is not limited thereto. Distal end sides of a pair of leg portions may be spaced apart from each other so as to be expanded open. A mount hole in which the pair of expandable leg portions are mounted may not be a threaded hole but may be a through hole formed in a single panel or a plurality of panels. The pair of leg portions are expanded open on a rear side of the mount hole by an extending portion that is forced between the leg portions to be locked at a hole edge on the rear side of the mount hole.

In the embodiment, the locking member 20 and the pin member 22 are described as being integrated into the unit. However, the invention is not limited thereto. For example, the locking member 20 and the pin member 22 may be formed separately, so that the pin member 22 is temporarily held on the locking member 20. For example, temporary holding hole portions may be formed on the side surfaces of the head portion 24 of the pin member 22, and temporary holding protruding portions may be formed on the inner wall surfaces of the upright portions 44, so that the temporary holding protruding portions fit in the temporary holding hole portions whereby the head portion 24 is connected to the upright portions 44.

By providing different configurations on the head portion 24 of the pin member 22 and upper surfaces of the upright portions 44 of the locking member 20, the fastener 10 can be mounted in the mount hole 12a with predetermined members fixed to the mount hole 12a. For example, hooks, bands or decorative materials may be provided on an upper surface of the head portion 24.

The invention claimed is:

1. A fastener comprising:
   a locking member that can be locked in a mount hole in a mount-base member; and
   a pin member that can be forced into the locking member and is connected to the locking member,
   wherein the locking member has a pair of leg portions that are inserted into the mount hole and a flange portion that is brought into abutment with a portion of the mount-base member that lies on a circumference of the mount hole, wherein the pin member has a head portion that is connected to the flange portion and an extending portion that extends from a rear side of the head portion, and wherein, when the head portion of the pin member is forced into the locking member, a connection between the flange portion and the head portion is released, and the extending portion travels between the pair of leg portions to expand open the pair of leg portions or to restrict the pair of leg portions from moving towards each other.

2. The fastener of claim 1, wherein at least part of the extending portion is held between the pair of leg portions with each other.

3. The fastener of claim 1, wherein the leg portion has a projecting portion or a recess portion on an inner side thereof, and the extending portion has a recess portion that faces the projecting portion on the leg portion or a projecting portion that faces the recess portion on the leg portion.

4. The fastener of claim 1, wherein the flange portion has a pair of projecting portions that project from proximal end portions of the pair of leg portions so as to move away therefrom and a pair of upright portions that are formed individually continuous to the projecting portions while standing in an axial direction, and wherein the head portion and the upright portions are connected integrally by a connecting portion.

5. The fastener of claim 4, wherein, upon forcing the pin member, the connecting portion is broken to release the connection, and the head portion travels between the pair of upright portions.

6. The fastener of claim 4, wherein the pin member has a expanding portion that is brought into abutment with the pair of leg portions on a front side of the mount-base member when forced in to expand open the pair of projecting portions.

* * * * *